United States Patent
Tarquini et al.

(10) Patent No.: US 8,463,919 B2
(45) Date of Patent: Jun. 11, 2013

(54) PROCESS FOR ASSOCIATING DATA REQUESTS WITH SITE VISITS

(75) Inventors: Maureen Mendick Tarquini, Cary, NC (US); Michael Chad Robertson, Raleigh, NC (US); Robert Asheville Sandefur, Jr., Chapel Hill, NC (US)

(73) Assignee: Hitwise Pty. Ltd, Melbourne (AU)

( * ) Notice: Subject to any disclaimer, the term of this patent is extended or adjusted under 35 U.S.C. 154(b) by 211 days.

(21) Appl. No.: 13/182,157

(22) Filed: Jul. 13, 2011
(Under 37 CFR 1.47)

(65) Prior Publication Data

US 2011/0276687 A1  Nov. 10, 2011

Related U.S. Application Data

(63) Continuation of application No. 12/415,992, filed on Mar. 31, 2009, now Pat. No. 7,991,901, which is a continuation of application No. 10/251,621, filed on Sep. 20, 2002, now Pat. No. 7,533,179.

(60) Provisional application No. 60/323,798, filed on Sep. 20, 2001.

(51) Int. Cl.
*G06F 15/16* (2006.01)

(52) U.S. Cl.
USPC .......................... 709/228; 709/229; 709/224

(58) Field of Classification Search
USPC ........................................ 709/224, 228, 229
See application file for complete search history.

(56) References Cited

U.S. PATENT DOCUMENTS

| | | | |
|---|---|---|---|
| 5,053,956 | A | 10/1991 | Donald et al. |
| 5,590,038 | A | 12/1996 | Pitroda |
| 5,640,577 | A | 6/1997 | Scharmer |
| 5,659,731 | A | 8/1997 | Gustafson |
| 5,666,528 | A | 9/1997 | Thai |
| 5,692,107 | A | 11/1997 | Simoudis et al. |
| 5,774,692 | A | 6/1998 | Boyer et al. |
| 5,797,136 | A | 8/1998 | Boyer et al. |
| 5,812,840 | A | 9/1998 | Shwartz |
| 5,822,750 | A | 10/1998 | Jou et al. |
| 5,822,751 | A | 10/1998 | Gray et al. |
| 5,844,218 | A | 12/1998 | Kawan et al. |

(Continued)

FOREIGN PATENT DOCUMENTS

| | | |
|---|---|---|
| GB | 2 346 229 | 2/2000 |
| WO | WO 00/57611 | 9/2000 |

(Continued)

OTHER PUBLICATIONS

U.S. Appl. No. 12/705,489, filed Feb. 12, 2010, Bargoli et al.

(Continued)

*Primary Examiner* — Kenny Lin
(74) *Attorney, Agent, or Firm* — Knobbe, Martens, Olson & Bear, LLP

(57) ABSTRACT

A process is disclosed for associating particular data requests from a user's computing device with particular site visits. The process includes determining whether the data requests are "forced content" requests, such as requests for advertisements. Such forced content requests, even if directed to a different domain from that of a site being visited, preferably are not treated as the end of the site visit or the start of a new site visit. The process may also consider other information regarding the data requests, such as whether they are requests for images, and whether they are directed to hosts associated with an open site visit.

18 Claims, 1 Drawing Sheet

U.S. PATENT DOCUMENTS

| | | | |
|---|---|---|---|
| 5,881,131 | A | 3/1999 | Farris et al. |
| 5,956,693 | A | 9/1999 | Geerlings |
| 5,963,932 | A | 10/1999 | Jakobsson et al. |
| 5,990,038 | A | 11/1999 | Suga et al. |
| 5,991,735 | A | 11/1999 | Gerace |
| 6,018,619 | A | 1/2000 | Allard et al. |
| 6,038,551 | A | 3/2000 | Barlow et al. |
| 6,070,147 | A | 5/2000 | Harms et al. |
| 6,073,140 | A | 6/2000 | Morgan et al. |
| 6,144,957 | A | 11/2000 | Cohen et al. |
| 6,151,601 | A | 11/2000 | Papierniak et al. |
| 6,157,927 | A | 12/2000 | Schaefer et al. |
| 6,223,171 | B1 | 4/2001 | Chaudhuri et al. |
| 6,304,869 | B1 | 10/2001 | Moore et al. |
| 6,339,769 | B1 | 1/2002 | Cochrane et al. |
| 6,366,903 | B1 | 4/2002 | Agrawal et al. |
| 6,405,173 | B1 | 6/2002 | Honarvar et al. |
| 6,446,200 | B1 | 9/2002 | Ball et al. |
| 6,448,980 | B1 | 9/2002 | Kumar et al. |
| 6,457,012 | B1 | 9/2002 | Jatkowski |
| 6,496,819 | B1 | 12/2002 | Bello et al. |
| 6,523,022 | B1 | 2/2003 | Hobbs |
| 6,523,041 | B1 | 2/2003 | Morgan et al. |
| 6,574,623 | B1 | 6/2003 | Leung et al. |
| 6,748,426 | B1 | 6/2004 | Shaffer et al. |
| 6,766,327 | B2 | 7/2004 | Morgan, Jr. et al. |
| 6,792,458 | B1 | 9/2004 | Muret et al. |
| 6,804,346 | B1 | 10/2004 | Mewhinney |
| 6,804,701 | B2 | 10/2004 | Muret et al. |
| 6,910,624 | B1 | 6/2005 | Natsuno |
| 6,976,056 | B1 | 12/2005 | Kumar |
| 6,983,379 | B1 | 1/2006 | Spalink et al. |
| 6,983,478 | B1 | 1/2006 | Grauch et al. |
| 6,985,887 | B1 | 1/2006 | Sunstein et al. |
| 6,987,734 | B2 | 1/2006 | Hundemer |
| 7,003,504 | B1 | 2/2006 | Angus et al. |
| 7,028,001 | B1 | 4/2006 | Muthuswamy et al. |
| 7,035,855 | B1 | 4/2006 | Kilger et al. |
| 7,076,475 | B2 | 7/2006 | Honarvar |
| 7,082,435 | B1 | 7/2006 | Guzman et al. |
| 7,185,016 | B1 | 2/2007 | Rasmussen |
| 7,200,602 | B2 | 4/2007 | Jonas |
| 7,272,591 | B1 | 9/2007 | Ghazal et al. |
| 7,277,900 | B1 | 10/2007 | Ganesh et al. |
| 7,346,703 | B2 | 3/2008 | Cope |
| 7,370,044 | B2 | 5/2008 | Mulhern et al. |
| 7,373,335 | B2 | 5/2008 | Cleghorn et al. |
| 7,403,942 | B1 | 7/2008 | Bayliss |
| 7,421,442 | B2 | 9/2008 | Gelb et al. |
| 7,433,864 | B2 | 10/2008 | Malik |
| 7,451,113 | B1 | 11/2008 | Kasower |
| 7,467,127 | B1 | 12/2008 | Baccash |
| 7,529,698 | B2 | 5/2009 | Joao |
| 7,536,346 | B2 | 5/2009 | Aliffi et al. |
| 7,562,093 | B2 | 7/2009 | Gelb et al. |
| 7,672,833 | B2 | 3/2010 | Blume et al. |
| 7,672,924 | B1 | 3/2010 | Scheurich et al. |
| 7,672,926 | B2 | 3/2010 | Ghazal et al. |
| 7,689,505 | B2 | 3/2010 | Kasower |
| 2001/0011245 | A1 | 8/2001 | Duhon |
| 2002/0007415 | A1 | 1/2002 | Douglis et al. |
| 2002/0010664 | A1 | 1/2002 | Rabideau et al. |
| 2002/0026507 | A1 | 2/2002 | Sears et al. |
| 2002/0052884 | A1 | 5/2002 | Farber et al. |
| 2002/0069122 | A1 | 6/2002 | Yun et al. |
| 2002/0103809 | A1 | 8/2002 | Starzl et al. |
| 2002/0116354 | A1 | 8/2002 | Baudu et al. |
| 2002/0128962 | A1 | 9/2002 | Kasower |
| 2002/0133504 | A1 | 9/2002 | Vlahos et al. |
| 2002/0169747 | A1 | 11/2002 | Chapman et al. |
| 2002/0198824 | A1 | 12/2002 | Cook |
| 2003/0009418 | A1 | 1/2003 | Green et al. |
| 2003/0018549 | A1 | 1/2003 | Fei et al. |
| 2003/0097380 | A1 | 5/2003 | Mulhern et al. |
| 2003/0101344 | A1 | 5/2003 | Wheeler et al. |
| 2004/0107132 | A1 | 6/2004 | Honarvar et al. |
| 2004/0111359 | A1 | 6/2004 | Hudock |
| 2004/0117358 | A1 | 6/2004 | Von Kaenel et al. |
| 2004/0153448 | A1 | 8/2004 | Cheng et al. |
| 2004/0199456 | A1 | 10/2004 | Flint et al. |
| 2004/0220896 | A1 | 11/2004 | Finlay et al. |
| 2006/0282359 | A1 | 12/2006 | Nobili et al. |
| 2007/0156554 | A1 | 7/2007 | Nikoley et al. |
| 2008/0109444 | A1 | 5/2008 | Williams et al. |
| 2008/0320575 | A1 | 12/2008 | Gelb et al. |
| 2010/0145840 | A1 | 6/2010 | Kasower |

FOREIGN PATENT DOCUMENTS

| | | |
|---|---|---|
| WO | WO 01/25896 | 4/2001 |
| WO | WO 01/84281 | 11/2001 |
| WO | WO 2004/114160 A3 | 12/2004 |

OTHER PUBLICATIONS

U.S. Appl. No. 12/705,511, filed Feb. 12, 2010, Bargoli et al.

Elmasri et al., "Fundamentals of Database Systems, Third Edition (Excerpts)," Jun. 2000, pp. 253, 261, 268-270, 278-280, 585, 595.

Ettorre, Paul Kahn on Exceptional Marketing. Management Review, vol. 38(11), Nov. 1994, pp. 48-51.

Ideon, Credit-Card Registry That Bellyflopped this Year, Is Drawing some Bottom-Fishers, The Wall Street Journal, Aug. 21, 1995, p. C2.

Intelligent Enterprise, Value-Added Data: Merge Ahead, Feb. 9, 2000, vol. 3, No. 3.

Various Posts from 2003 and 2004 at http://web.archive.org/web/2005045221950/http://p2p.wrox.com/topic.asp?TOPIC_ID=6513.

Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.

PCT/IB 02/05540, Supplemental European Search Report, Oct. 21, 2004.

Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.

Sax, Michael M., "Data Collection and Privacy Protection : An International Perspective", Presentation: Managing Online Risk and Liability Conference, Aug. 31, 1999 (58 pages).

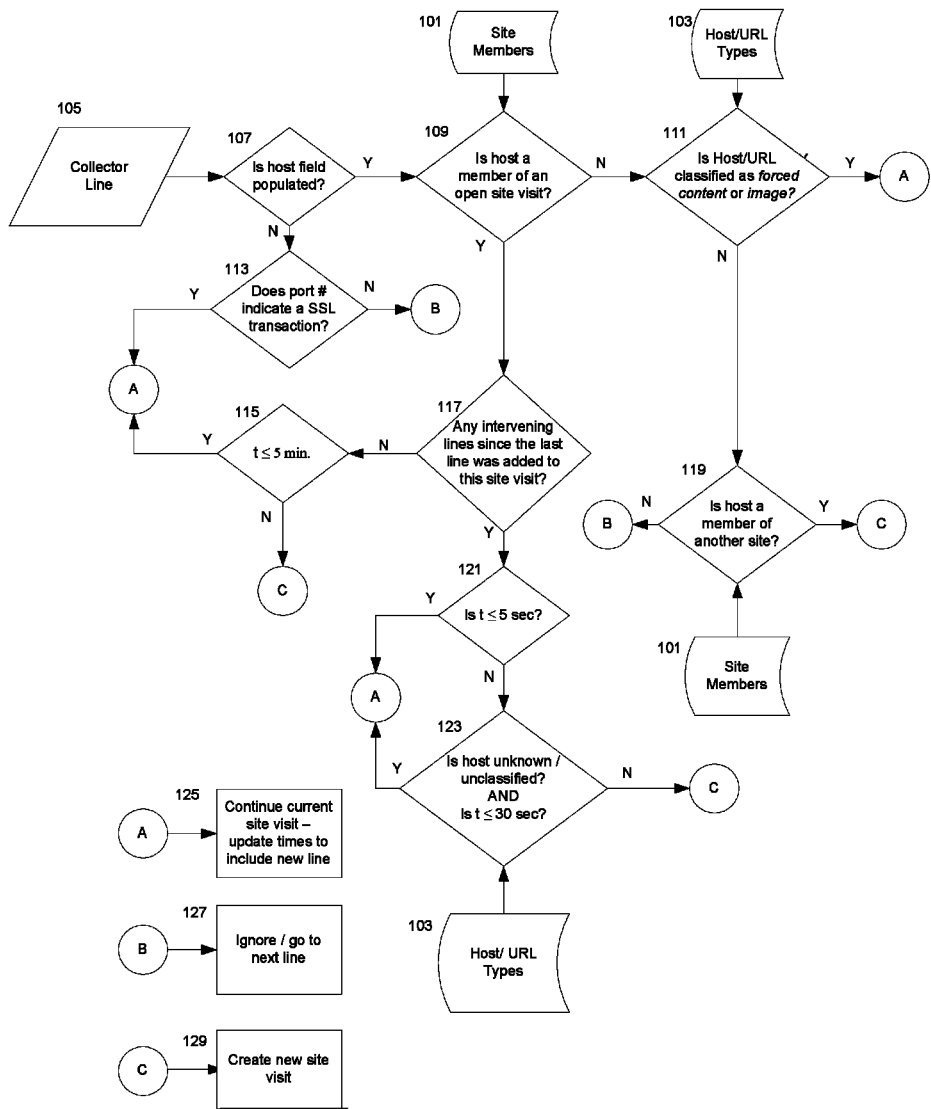

US 8,463,919 B2

PROCESS FOR ASSOCIATING DATA REQUESTS WITH SITE VISITS

CROSS-REFERENCE TO RELATED APPLICATIONS

This application is a continuation of U.S. patent application Ser. No. 12/415,992, filed Mar. 31, 2009, entitled METHOD AND SYSTEM FOR CHARACTERIZATION OF ONLINE BEHAVIOR, which is a continuation of U.S. patent application Ser. No. 10/251,621, now U.S. Pat. No. 7,533,179, filed Sep. 20, 2002, having the same title, which claims priority to U.S. Provisional Pat. App. No. 60/323,798, filed Sep. 20, 2001, having the same title. All of the aforementioned applications are hereby incorporated by reference.

BACKGROUND

1. Field of the Invention

This invention relates to a method and system for collecting and classifying computer network traffic, particularly Internet traffic. Specifically, the method and system of the invention characterize the interaction between users and web sites to facilitate construction of more accurate online behavior profiles for marketing purposes.

2. Description of the Related Art

The Internet has rapidly grown into a center for conducting commerce with unprecedented efficiency and commercial advantage; however, the Internet also presents numerous new challenges to the development and execution of appropriate business models and processes. To design and implement effective marketing and business plans, companies need to gain a better understanding of consumer behavior and preferences while they are conducting Internet commerce.

Behavior profiles are created using network usage data collected through various methods. Once the data is collected, it is analyzed to determine the behavior of a particular user. In order to create an accurate behavior profile, it is useful to generalize Internet usage by identifying the types of Web sites a particular type of user accesses and the way that type of user accesses a particular type of Web site.

For example, it would be valuable to a merchant to know that users from a geographical area regularly purchase books from a merchant with a website, for example, Amazon.com™. However, there is a need for more generalized data, than that which is specific to a particular merchant. It is desirable to have a system that can create what are known as "generalized behavior profiles." By generalized behavior profile is meant a collection of data that describes the attributes and usage patterns of online shoppers, but does not contain personally identifiable information of such online shoppers. More specifically, it is valuable to know that users in a particular geographical area regularly conduct electronic commerce by accessing online catalog and shopping sites by following links on a Web portal site.

To build accurate generalized behavior profiles, it is desirable to know typical behaviors and actions that lead up to a purchase. For example, it would be desirable to know that many users searched one online merchant site for books to purchase and then went to a different online merchant site to make the actual purchase. For the specific merchant whose site was used for browsing, this information indicates that the site is successful in attracting potential shoppers, but perhaps prices need to be more competitive to retain those initially coming to the site. More generally, this information may indicate that price is a factor which overrides factors such as convenience and functionality of a website in the decisions of similar consumers.

SUMMARY

A process is disclosed for associating particular data requests from a user's computing device with particular site visits. The process includes determining whether the data requests are "forced content" requests, such as requests for advertisements. Such forced content requests, even if directed to a different domain from that of a site being visited, preferably are not treated as the end of the site visit or the start of a new site visit. The process may also consider other information regarding the data requests, such as whether they are requests for images, and whether they are directed to hosts associated with an open site visit.

BRIEF DESCRIPTION OF THE DRAWING

FIG. 1 is a basic flow chart of the method to characterize computer network traffic data.

DETAILED DESCRIPTION

In accordance with the invention, a method and system are provided for collecting and characterizing computer network traffic data. All data captured is analyzed and organized with sufficient level of detail (or granularity) to determine a single request from a server (e.g. a single .gif file on a web site). As one of ordinary skill in the art will appreciate, there are many methods for organizing data to achieve this level of detail. Each data request is analyzed to determine if it comes from a server with which an ongoing end user interaction (or open site visit) is occurring. If not, generally a new site visit is created. If the data request is part of an open site visit, then the time is compared to the time of the last interaction with that site. If the interval is sufficiently small, then the data request is generally treated as a continuation of that open site visit. If the interval is sufficiently large, a new site visit is created.

In a step 101, a data table that contains all known hosts (the part of the URL path name that precedes the backslash) that direct a user to a particular location (site) is established. This is referred to as the Site Members Table. By way of example, let us consider the merchant known as Barnes and Noble. In the case of Barnes and Noble, the following hosts are all members of the Barnes and Noble site: www.bn.com, www-.barnesandnoble.com, music.barnesandnoble.com, shop.barnesandnoble.com, and 207.36.92.145. By compiling a table containing all hosts which are members of the Barnes and Noble site, this allows the capture of unique users, visits, and the calculation of visit durations for the Barnes and Noble site regardless of what host is entered or how the user navigates on the site.

To calculate durations accurately, the logic of the method and system must also have a capability for handling components (ads, images, etc.) of a Web site coming from servers (hosts) that are not members of a given site. An additional data table is compiled in step 103, and contains hosts that are classified as "forced content" (e.g. ads, or banners, or counters). Further, URL content types that are classified as images (e.g. .gif, .jpg, etc.) are also compiled into this data table in step 103. This data table is referred to as the Host/URL Types Table.

For example, the host ads.ebay.com is an advertisement, and may appear in the datastream, and thereby suggest a visit to the merchant known as eBay, when a user is actually visiting the merchant using the URL amazon.com. The method and system must recognize that although that host is not a member of the current site, it is a component of that site visit to the merchant known as Amazon, and may also appear on many other sites. The logic underlying the method and system therefore treats ads, images, counters, etc., as part of a running visit, and does not allow the hosts classified as ads, images, counters, etc., to "break" a running visit or spawn the creation of a new site visit. Lines that are generated from secure socket layer (SSL) traffic will also be included as part of the most recent site visit.

The method and system can create concurrently running site-visit sessions in the event a user has multiple browsers open. Web sites with frames can also be perceived as multiple visits with overlapping times if the frames are served from hosts belonging to different sites.

The method and system employ the following rules:
1. A new site visit will begin if the line includes a host that is a valid "site member" and:
    An open site visit is not already running for that site;
    The URL does not have a content type of "image" (e.g., .gif, .jpg, etc.); and
    The host is not classified as "forced content" (e.g., ads, banners, counters, etc.)
2. If the host is a site member of an "open" site visit and there are no intervening lines and less than five (5) minutes' time has passed, it will be included in the open site visit.
3. If the line contains a host that is a site member of an open site visit (Site "A"), but there have been one or more intervening lines, it will roll into the site visit from Site A if the following conditions are met:
    The intervening lines contain known (or classified) hosts and the elapsed time is less than/equal to five (5) seconds or
    The intervening lines have null host fields or contain only unknown hosts and the elapsed time is less than/equal to thirty (30) seconds.
    Note that if the intervening lines contain a host that is a member of Site B, an overlapping site visit for Site B would start.
4. If the host field is not populated and the port number indicates a secure socket layer (SSL) transaction, then the line is rolled into the most-recent open site visit. Lines that contain any other port number with a null host field are ignored.
5. If the line contains a host that is not a member of any open site visit and the host is classified as "forced content" (e.g., ads, banners, counters, etc.), the line will roll into the most-recently created site visit.
6. If the line that contains a host that is not a member of an open site visit and the URL content type is defined as "image" (e.g., .gif, .jpg, etc.), it will roll into the most-recent site visit.

The level of greatest detail at which data is collected is referred to as a Collector Line, and contains all captured elements (user, times, bytes, port number, content types, etc.) from a single request from a server (e.g., a single .gif file on a Web site.) The Site Visits Table is an aggregate table that captures start time, end time, duration, and bytes for each intentional visit to a particular site.

In step 107, each Collector Line from step 105 is analyzed, and it is determined whether or not the host field of the Collector Line is populated. If not, then at step 113, the port number is analyzed to determine if an SSL transaction is indicated. If an SSL transaction is indicated, then at step 125, the current site visit is continued, and times are updated to include the new Collector Line. If an SSL transaction is not indicated, then, at step 127, the Collector Line is ignored, and the next Collector Line is analyzed.

If, in step 107, the host field is populated, then the host is checked against the Site Members Table in step 109 to determine if the host is a member of an open site visit. If so, a check is performed in step 117 to determine if there have been any intervening Collector Lines since the last line was added to this site visit. If not, the time interval between the time of the current Collector Line and the time that the last Collector Line was added to the site visit is analyzed in step 115. If the interval is less than or equal to an arbitrary but suitably large time interval, then, in step 125, the current site visit is continued, and times are updated to include the new Collector Line. If the interval is greater than the arbitrary but suitably large time interval, then a new site visit is created in step 129. In a preferred embodiment, the arbitrary but suitably large time interval is within the range of approximately zero to fifteen minutes. In a more preferred embodiment, the arbitrary but suitably large time interval is within the range of approximately zero to ten minutes. In the most preferred embodiment, the arbitrary but suitably large time interval is approximately five minutes.

If it is determined, in step 117, that there were intervening Collector Lines since the last line was added to this site visit, the time interval between the time of the current Collector Line and the time that the last Collector Line was added to the site visit is analyzed in step 121. If the time interval is less than or equal to an arbitrary but suitably small time interval, then, in step 125, the current site visit is continued, and times are updated to include the new Collector Line. If the time interval is greater than the arbitrary but suitably small time interval, then in step 123, the host is checked against the Host/URL Types Table to determine if the host is known or classified. In a preferred embodiment, the arbitrary but suitably small time interval is within the range of approximately zero to twenty seconds. In a more preferred embodiment, the arbitrary but suitably small time interval is within the range of approximately zero to ten seconds. In the most preferred embodiment, the arbitrary but suitably small time interval is approximately five seconds.

If, in step 123, the host is not known or classified, and the time interval is less than or equal to an arbitrary but suitably moderate time interval, then in step 125, the current site visit is continued, and times are updated to include the new Collector Line. If the host is known or classified or if the time interval is greater than the arbitrary but suitably moderate time interval, then in step 129, a new site visit is created. In a preferred embodiment, the arbitrary but suitably moderate time interval is within the range of approximately zero to sixty seconds. In a more preferred embodiment, the arbitrary but suitably moderate time interval is within the range of approximately zero to forty-five seconds. In the most preferred embodiment, the arbitrary but suitably moderate time interval is approximately thirty seconds.

In step 109, if the host is not a member of an open site visit, then the host and URL are checked in step 111 against the Host/URL Types Table to determine if they are classified as forced content, or if the URL is classified as an image. If so, then in step 125, the current site visit is continued, and times are updated to include the new Collector Line 125. If not, the host is checked against the Site Members Table in step 119, to determine if the host is a member of another site. If not, the Collector Line is ignored, and the next Collector Line is analyzed in step 127. If the host is a member of another site, then a new site visit is created in step 129.

The duration of a site visit is determined by subtracting the start time from the latest end time. Because the data lines are analyzed in order by start time, the latest end time may not be the last time received. For example, a request to a web server for a web page may involve multiple requests for different parts of the page. Specifically, one request line may have a start time of 10:02 a.m. and an end time of 10:05 a.m., and a second request line may have a start time of 10:03 a.m. and an end time of 10:04 a.m. Thus, the latest end times are used in the determination of the site visit duration.

There are two indicators used to determine when a site visit ends: when the end user closes the session, or there is an arbitrary but suitably large period of inactivity. The most preferred arbitrary but suitably large period of inactivity is fifteen minutes. When either of these indicators is present, all open site visits for the end user are closed.

What is claimed is:

1. A method of classifying data requests from a user computing device, the method comprising:
   accessing a record of data requests sent over a network by the user computing device to one or more hosts;
   classifying at least a first data request represented in said record as being part of a visit to a first site; and
   determining whether a subsequent data request represented in said record is part of the visit to the first site based at least partly on whether the subsequent data request is directed to a host that is classified as a source of forced content;
   said method performed by a computer system.

2. The method of claim 1, wherein the method comprises classifying the subsequent data request as being part of the visit to the first site in response to determining that the subsequent data request is directed to a host that is classified as a source of forced content.

3. The method of claim 2, wherein the host is not a member of the first site.

4. The method of claim 1, wherein the determination of whether the subsequent data request is part of the visit to the first site is additionally based on whether the host is one of a plurality of hosts that are classified as members of the first site.

5. The method of claim 1, wherein the determination of whether the subsequent data request is part of the visit to the first site is additionally based on whether the subsequent data request is a request for an image.

6. The method of claim 1, wherein the determination of whether the subsequent data request is part of the visit to the first site is additionally based on an amount of time that has transpired since a most recent interaction between the user computing device and the first site.

7. The method of claim 1, wherein the method comprises classifying the subsequent data request as the start of a visit to a second site at least partly in response to determining that the subsequent data request (1) is not directed to a host classified as a source of forced content, (2) is not a request for an image, and (3) is not directed to a host that is a member of the first site.

8. A system capable of classifying data requests, the system comprising:
   a computer data repository that stores a record of data requests associated with a user; and
   a processor configured to classify the data requests by a process that comprises:
      classifying at least a first data request represented in said record as being part of a visit by the user to a first site; and
      determining whether a subsequent data request represented in said record is part of the visit to the first site based at least partly on whether the subsequent data request is directed to a host that is classified as a source of forced content.

9. The system of claim 8, wherein the process comprises classifying the subsequent data request as being part of the visit to the first site in response to determining that the subsequent data request is directed to a host that is classified as a source of forced content.

10. The system of claim 8, wherein the determination of whether the subsequent data request is part of the visit to the first site is additionally based on whether the host is classified as a member of the first site.

11. The system of claim 8, wherein the determination of whether the subsequent data request is part of the visit to the first site is additionally based on whether the subsequent data request is a request for an image.

12. The system of claim 8, wherein the determination of whether the subsequent data request is part of the visit to the first site is additionally based on an amount of time since a most recent interaction by the user with the first site.

13. The system of claim 8, wherein the process comprises classifying the subsequent data request as the start of a visit to a second site at least partly in response to determining that the subsequent data request (1) is not directed to a host that is classified as a source of forced content, (2) is not a request for an image, and (3) is not directed to a host that is a member of the first site.

14. A computer system configured to access a record of data requests associated with a user, and to associate particular data requests represented therein with particular site visits by the user based on at least the following: (1) whether the data requests are directed to hosts that are classified as sources of forced content, and (2) whether the data requests are directed to hosts that are site members associated with open site visits.

15. The computer system of claim 14, wherein the computer system is configured to associate the data requests with particular site visits based further on whether the data requests are requests for images.

16. The computer system of claim 14, wherein the computer system is configured to associate the data requests with particular site visits based further on amounts of time that have transpired since most recent interactions by the user with particular sites.

17. The computer system of claim 14, wherein the computer system is configured to associate the data requests with particular site visits based further on whether the requests are Secure Socket Layer requests.

18. The computer system of claim 14, wherein the computer system is configured to treat a data request as a start of a new site visit at least partly in response to determining that the data request (1) is not directed to a host that is a member of an open site visit, (2) is not directed to a host that is classified as a source of forced content, and (3) is not a request for an image.

* * * * *